United States Patent [19]

Ono

[11] 4,130,866

[45] Dec. 19, 1978

[54] DATA PROCESSOR HAVING A CIRCUIT STRUCTURE SUITABLE FOR FABRICATION IN LSI FORM

[75] Inventor: Masahiko Ono, Tokyo, Japan

[73] Assignee: Tokyo Shibaura Electric Co., Ltd., Kanagawa, Japan

[21] Appl. No.: 788,935

[22] Filed: Apr. 19, 1977

[30] Foreign Application Priority Data

Apr. 19, 1976 [JP] Japan .................................. 51-44257

[51] Int. Cl.$^2$ .................................................. G06F 1/04
[52] U.S. Cl. .................................................... 364/200
[58] Field of Search ... 364/200 MS File, 900 MS File

[56] References Cited

U.S. PATENT DOCUMENTS

| | | | |
|---|---|---|---|
| 3,426,328 | 2/1969 | Gunderson | 364/200 |
| 3,656,123 | 4/1972 | Carnevale | 364/200 |
| 3,825,905 | 7/1974 | Allen, Jr. | 364/200 |
| 3,909,800 | 9/1975 | Recks | 364/200 |
| 3,919,695 | 11/1975 | Gouding | 364/200 |
| 3,939,452 | 2/1976 | Faggian | 364/200 |
| 3,970,997 | 7/1976 | Daly | 364/200 |
| 4,004,281 | 1/1977 | Bennett | 364/200 |
| 4,021,784 | 5/1977 | Kimlinger | 364/200 |
| 4,050,096 | 9/1977 | Bennett | 364/200 |
| 4,063,308 | 12/1977 | Collins | 364/200 |

*Primary Examiner*—James D. Thomas
*Attorney, Agent, or Firm*—Oblon, Fisher, Spivak, McClelland & Maier

[57] ABSTRACT

A data processor comprising a first partial processing unit and second partial processing unit. The first partial processing unit can be made in LSI form since practically all the functions which the data processor must perform are concentrated in this part. The portions which are driven by high-frequency signals and consequently are not suitable for being made in LSI form are concentrated in the second partial processing unit. The second partial processing unit supplies a clock pulse to the first partial processing unit in either a synchronization mode or a non-synchronization mode for read-out of data.

7 Claims, 11 Drawing Figures

DATA PROCESSOR HAVING A CIRCUIT STRUCTURE SUITABLE FOR FABRICATION IN LSI FORM

BACKGROUND OF THE INVENTION

1. Field of the Invention

This invention relates to a data processor suitable for fabrication in integrated circuit form, and more particularly to an I/O (Input/Output) processor for carrying out processing of data transferred between a CPU and input/output medium.

2. Description of the Prior Art

Recently, with the development of memory media, such as magnetic disc, magnetic drum and magnetic tape, many improvements in I/O processors have been made.

The I/O processor carries out processing of data transferred between a central processing unit (CPU) and a memory medium or a transmission line. Its functions include, for instance, (1) series-parallel conversion of input data, (2) examination of distinctive identifying code signals accompanying input data, (3) buffering of input data, (4) cyclic redundancy check (check of errors) of input data, (5) buffering of output data (received from CPU), (6) parallel-series conversion of output data, (7) production of identifying code signals added to output data, (8) production of cyclic redundancy check codes added to output data, (9) control of the data memory medium ("seek" of the head, leading of the Head, and the like, when the data memory medium is for instance a magnetic disc), (10) synchronization of driving clock signals for input data. The processing speed required for data transfer by the I/O processor is to a very large extent dependent on the capacity of the data memory medium as regards read-out/write-in speed. For example, in the case of magnetic disc, a processing capacity of at least 250 K bit/sec or more is required. But in the case of the magnetic disc, single bit information generally appears on the disc medium as two bits, that is to say a "clock bit" and a "data bit", and even if the speed of the I/O processor as such is to be 250 K bits/sec, the fact is that in practice the processing capacity required is a speed of 500 K bit/sec. Moreover, the bit interval of the input data fluctuates. The main reasons for this are non-uniformity of rotation in the case of a magnetic disc, and mutual interference between the recorded bits on the medium, and the like. The fluctuation is as much as ±25%, and in the foregoing example, also, when the standard interval is 2 μsec the minimum interval becomes 1.5 μsec. Therefore, the I/O processor must be capable of following such speed fluctuations.

In known processing equipment, in view of the above requirements, and more particularly in regard to processing speed, small scale integrated circuit devices consisting of relatively high-speed bipolar transistors or groups thereof are used in the circuit elements making up the processing unit. That is to say, specialized circuit groups respectively corresponding directly to the various functions set forth in the foregoing items (1) to (10) are combined forming the I/O processor.

Now, with the progress in large scale integrated circuit (hereinafter referred to as LSI) technology in recent years, the possibility has arisen that even the high-speed data processing equipment with which the present invention is concerned can be integrated on a single LSI chip. As regards making this data processor in LSI form, the following two problematical points are to be considered.

(1) Problem regarding the speed of the elements

Practical processors for performing advanced logical operational functions which include all of the various functions set forth in the foregoing items (1) to (10) must have a high integration density, and for this purpose integrated circuits with MOS structure are more suitable than those with bipolar structure. But the properties of MOS transistors present a difficulty in that their speed of transmission of signals is inferior to that of bipolar transistors. This is closely related to the areas of the elements themselves and therefore a straightforward comparison is difficult, but for instance the delay for one gate stage is about 1 to 10 ns in the case of bipolars, whereas it is 10 to 100 ns in the case of MOS. One may conclude therefore that there is a difference amounting to about 1 to 2 decimal places. Accordingly, for the purpose of carrying out high-speed data processing with a data processor in the form of an integrated circuit with MOS structure, the structure of the processor must be considered in itself.

(II) Problems regarding the circuit structure of the processor

In designing LSI it is of course highly advisable to select a circuit structure with high integration efficiency. But if a data processor which is a combination of specialized circuit groups directly corresponding to the various functions set forth in the foregoing items (1) to (10), is formed as an integrated circuit device while remaining otherwise unchanged, it is quite certain that this is not very advisable, at least from the point of view of integration efficiency, for instance because of the random nature of the circuit structure and because high-frequency pulses are needed for each circuit.

SUMMARY OF THE INVENTION

Accordingly, one object of this invention is to provide a data processor having a circuit structure suitable for being made in LSI form.

Another object of this invention is to provide a I/O processing unit consisting of two partial processing units.

According to this invention, a data processor comprises, (a) a first partial processing unit having an arithmetic-logic unit (ALU), a storage for designating the operation of the arithmetic-logic unit, a group of registers for effecting temporary memorization of data in order to make the arithmetic-logic unit operate and a timing pulse generator for generating a plurality of pulses which drive the first partial processing unit, (b) a second partial processing unit having a clock pulse generator for forming a clock pulse of controllable frequency, (c) a clock signal line for sending out the clock pulse from the second partial processing unit to the timing pulse generator in the first processing unit (d) a control line connecting the first partial processing unit with the second partial processing unit for sending out a control signal from the first partial processing unit to the second partial processing unit to change the frequency of the clock pulse, the plurality of pulses in the first partial processing unit being produced by the timing pulse generating circuit in response to the clock pulse applied from the second partial processing unit as a pulse source.

BRIEF DESCRIPTION OF THE DRAWINGS

A more complete appreciation of the invention and many of the attendant advantages thereof will be readily attained as the same becomes better understood by reference to the following detailed description when taken in connection with the accompanying drawings wherein.

DETAILED DESCRIPTION OF THE PREFERRED EMBODIMENTS

Figure 1:
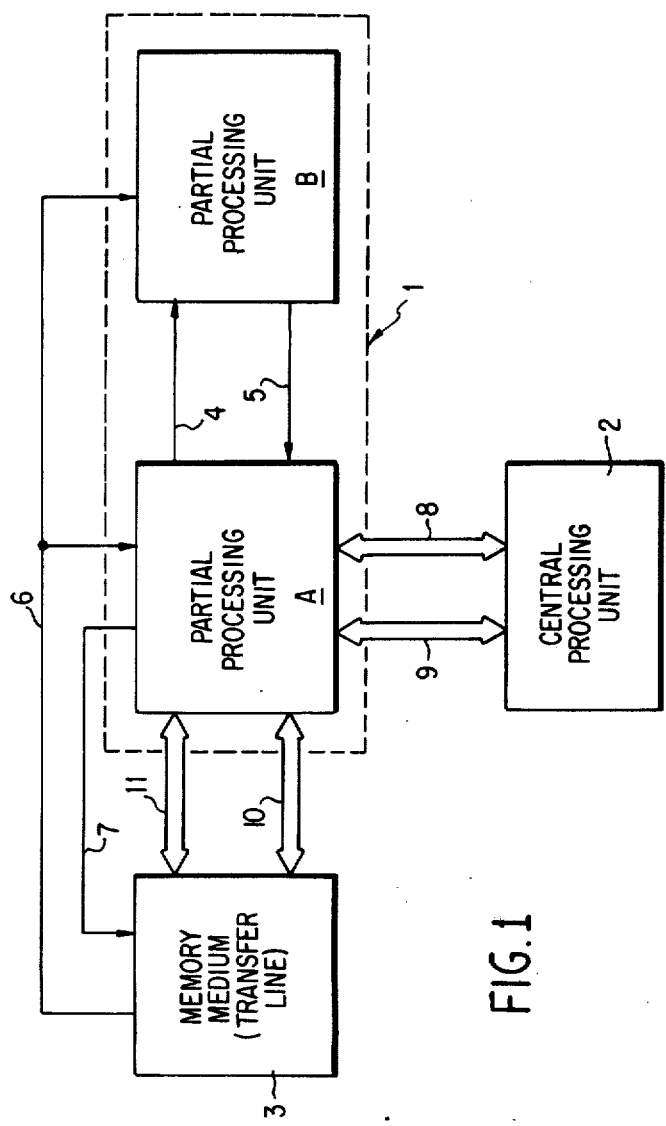
FIG. 1 is a block diagram showing an embodiment according to this invention.

Referring now to the drawing, FIG. 1 is a block diagram showing the general structure of this I/O processor.

The partial processing unit A described hereinafter is the part which is to be made in LSI form; practically all the functions which the data processing unit must perform are concentrated in this part. On the other hand the portions which are driven by high-frequency signals and consequently are not suitable for being made in LSI form are concentrated in the partial processing unit B described hereinafter. The driving clock signals of the aforesaid partial processing unit A are made to follow the fluctuations of the data transfer interval, so that the data processing operations can be made smooth. The I/O processor 1 is disposed between the central processing unit 2 and a memory medium (or transmission line) 3, and carries out the previously described functions (1) to (10). This data processor 1 consists of the partial processing unit A and the partial processing unit B, and these two are coupled to one another by a synchronization/non-synchronization indication signal line 4 for read-out data and by a clock signal line 5. Also, the central processing unit 2 and the partial processing unit A are coupled together by command/data transfer lines 8 and transfer control lines 9; and the partial processing unit A and the memory medium 3 are coupled together by medium control lines 10 and medium state signal lines 11. There are also a read-out data line 6 and a write-in data line 7, and of these, the read-out data line 6 supplies input from the memory medium 3 both to the partial processing unit A and also to B. As regards the input to the former, the read-out data is for processing as "information", and the input to the latter is for the purpose of making the clock signals follow the fluctuations of the transfer interval of the data. That is to say, the indication signal line 4 is provided for the purpose of making a distinction between synchronization of the data with the clock signal or non-participation in synchronization, and when the content of the indication of this line is "true" (logical "1"), the clock signal of the signal line 5, which is applied to the partial processing unit A, fluctuates in frequency, following the read-out data, and if this content is "false" (logical "0"), namely if the write-in operation is carried out, the clock signal goes to a specific frequency.

In order to describe the above-mentioned embodiment in more concrete terms the case in which a magnetic disc is used as the memory medium 3 will be described. Here, it is assumed that this magnetic disc has the following physical/electrical properties.

Figure 2:
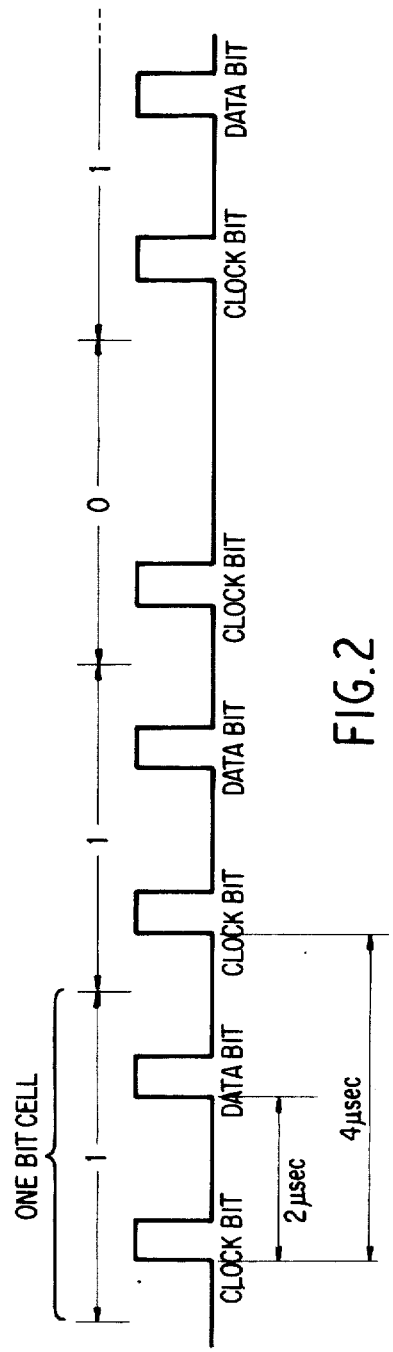
FIG. 2 is a waveform of the read out data from the magnetic disc.

(i) The recording system is the frequency modulation system. That is to say, a single bit of data read out from the magnetic disc is presented on the medium as two successive bits, a clock bit and a data bit, as shown in FIG. 2. The clock bit is always present except in very special cases, and the data bit expresses logical "1" by its presence and expresses logical "0" by the fact of its absence.

(ii) The interval between clock bits is 4 $\mu$sec, and the interval between a clock bit and a data bit is 2 $\mu$sec.

(iii) The range of fluctuation of the bit interval between the read-out data bits remain within a range of ± 500 nsec with respect to their standard positions.

Figure 3:
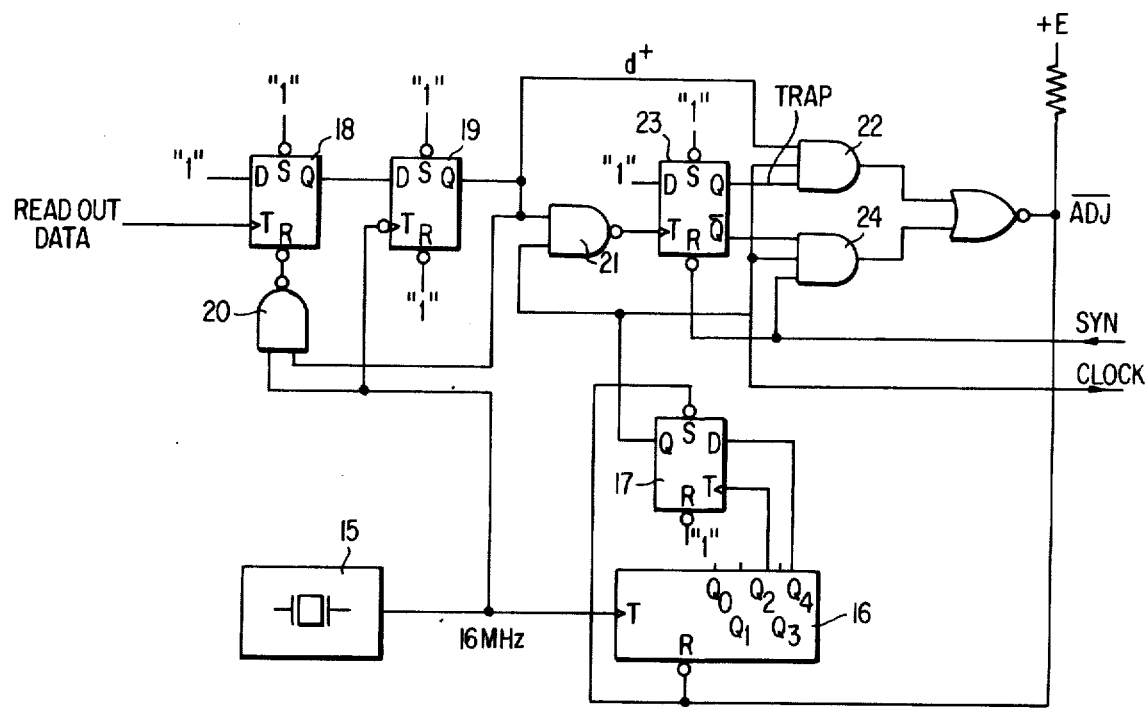
FIG. 3 is a circuit diagram of partial processing unit B.
Figure 4:
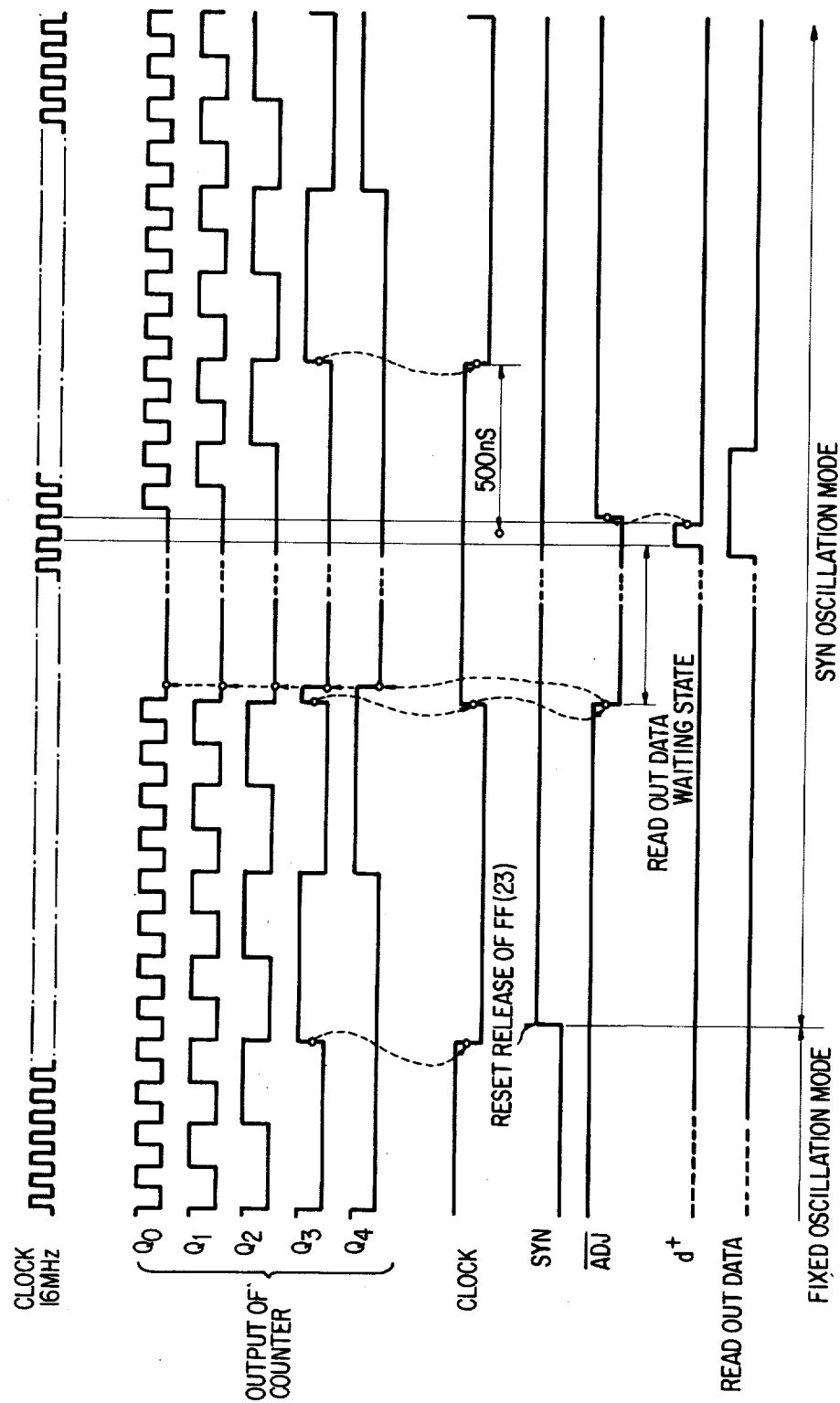
FIG. 4 is a time chart showing the operation of the partial processing unit B.

A detailed embodiment of the circuit of the partial processing unit B is shown in FIG. 3, and an example of a time chart corresponding to its operation sequence is shown in FIG. 4. Now, the circuit of FIG. 3 has two states of operation, that is to say a fixed oscillation mode and a synchronizing oscillation mode, and the synchronization/non-synchronization indication signal SYN for the read-out data determines which of the two is to take effect.

(I) Fixed oscillation mode (SYN=0)

In this mode a clock frequency CLOCK of which the frequency is fixed quite irrespectively of the read-out data, is supplied as output and applied to the partial processing unit A. The clock frequency of this embodiment is 0.5 MHz; to produce this, the frequency, 16 MHz, of a basic clock signal supplied as output by an oscillator 15 is divided by 32 by means of binary counters 16. Also, a flip-flop 17 is provided for the purpose of shifting by ¼ period, the counter output $Q_4$ which is the original frequency divided by 32. In this mode, the signal $\overline{ADJ}$, which effects setting of the flip-flop 17 and resetting of the binary counters 16, is always fixed at $$\overline{ADJ} = 1 \text{ (that is to say ADJ = 0)}$$

and does not function.

(II) Synchronizing oscillation mode (SYN = 1)

In this mode a clock signal CLOCK having a synchronous relationship with the read-out data is supplied as output and applied to the partial processing unit A. This circuit supplements the read-out data, and this is timed to take effect when the clock signal is logical "1". Also, the period during which the clock signal is logical "1" is 1 $\mu$sec, and the period during which it is logical "0" is also 1 $\mu$sec, that is to say the duty is 50% in the case of this embodiment. When the read-out date is supplemented in logical "1" sections, the partial processing unit B carries out subsequent sequence operation just as though the output data had come in between sections in which the clock signal is logical "1". That is to say, after the read-out data has been supplemented, the clock signal maintains the logical "1" state for 0.5 μsec in the case of the present embodiment, and consequently in the synchronizing oscillation mode, the width of the section during which the clock signal is logical "1" depends ont the timing of the supplementation of the read-out data and can fluctuate over a range from a minimum of 0.5 μsec to a maximum of 1.5 μsec. On the other hand, the width of the logical "0" section is fixed at 1 μsec.

A detailed description of the operation of this circuit will be made in conjunction with FIGS. 3 and 4. First, by means of the flip-flops 18 and 19 and the "NAND" circuit 20, the read-out data is converted to a narrow pulse $d^+$ whose width is 62.5 nsec, and through the intermediary of "NAND" circuits 21 and 22 the pulse $d^+$ is supplied for a clock correction operation (synchronizing operation). On the other hand, when the synchronization/non-synchronization indication signal SYN supplied as output from the partial processing unit A becomes logical "1", the resetting for the flip-flop 23 is released. The signal SYN becomes logical "1" in the state in which the clock signal CLOCK is logical "0" (see FIG. 4). Next, when this clock signal becomes logical "1", the three inputs of the NAND circuit 24 all become "1", and accordingly we get $$\overline{ADJ} = 0$$

so that the flip-flop 17 goes into the set state and also the counters 16 go into the reset state. This state correspond to the state of waiting for the initial read-out data pulse for correctly starting the synchronizing oscillation. Also, in this state the clock signal CLOCK is still logical "1". In this state, when read-out data is supplied as input, the state $$d^+ \cdot CLOCK = 1$$

is produced, the flip-flop 23 is triggered through the intermediary of the NAND circuit 21 and the output TRAP of this flip-flop becomes logical "1". This is set, precisely, by the rear edge of the pulse $D^+$. When this happens the conditions of the NAND circuit 24 cease to be present and we get $$\overline{ADJ} = 1$$

so that the set input for the flip-flop 17 and the reset input for the counters 16 are released. This causes the counters 16 to begin to operate, so that the clock signal becomes logical "0" when 0.5 μsec has expired after releases.

The NAND circuit 24 functions only in the case of the starting of the aforesaid synchronizing oscillation, and the subsequent synchronizing operation is effected by the NAND circuit 22. That is to say, when read-out data is supplied as input in the sate in which the clock signal is logical "1", the state $$d^+ \cdot CLOCK \cdot TRAP = 1$$

is produced, and the NAND circuit 22 makes $$\overline{ADJ} = 0$$

and the counters 16 reset so that as described previously the subsequent operation is corrected as though the pulse $d^+$ had come between CLOCK = 1 sections.

Figure 5:
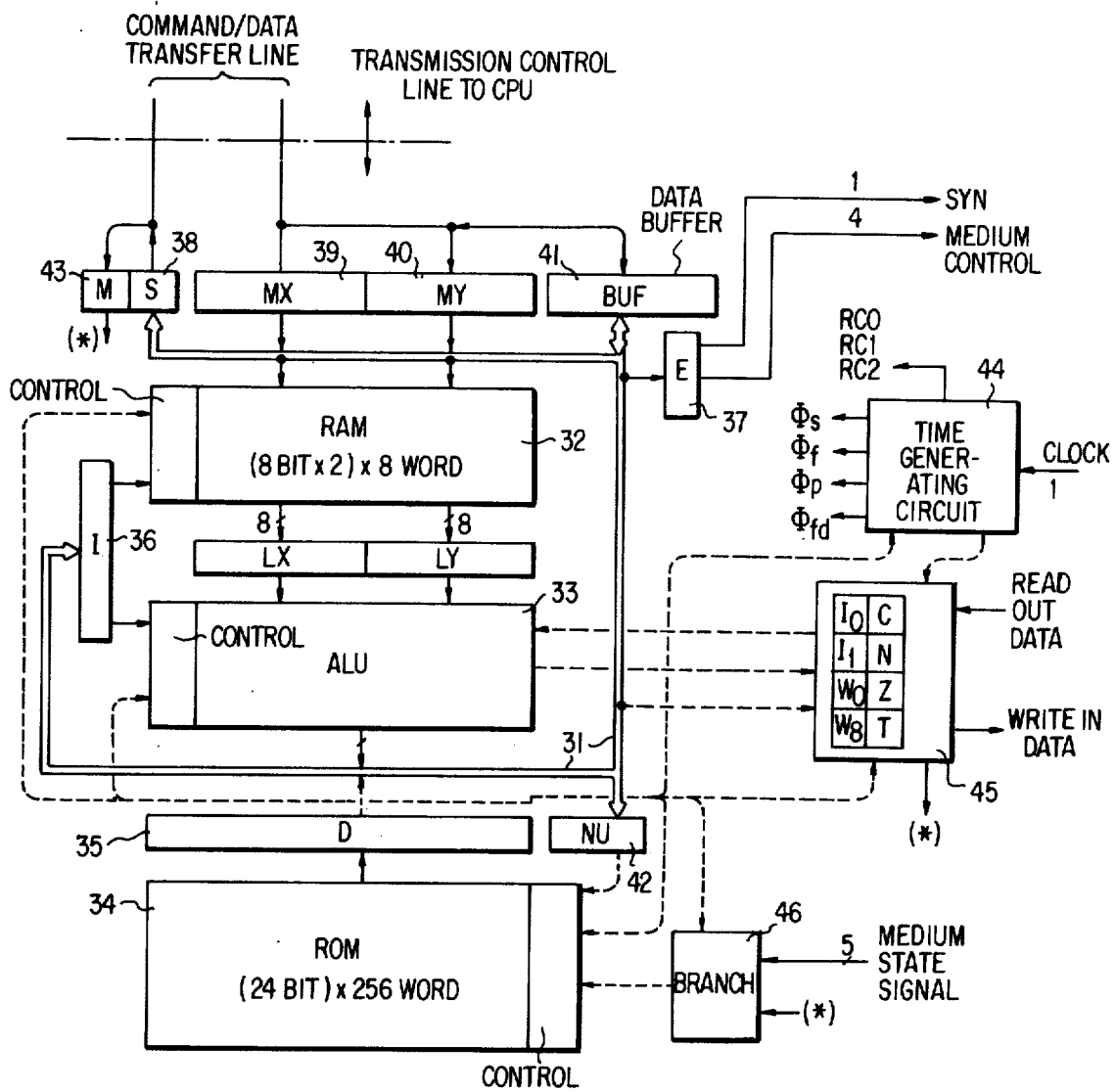
FIG. 5 is a detailed block diagram showing partial processing unit A.
Figure 6:
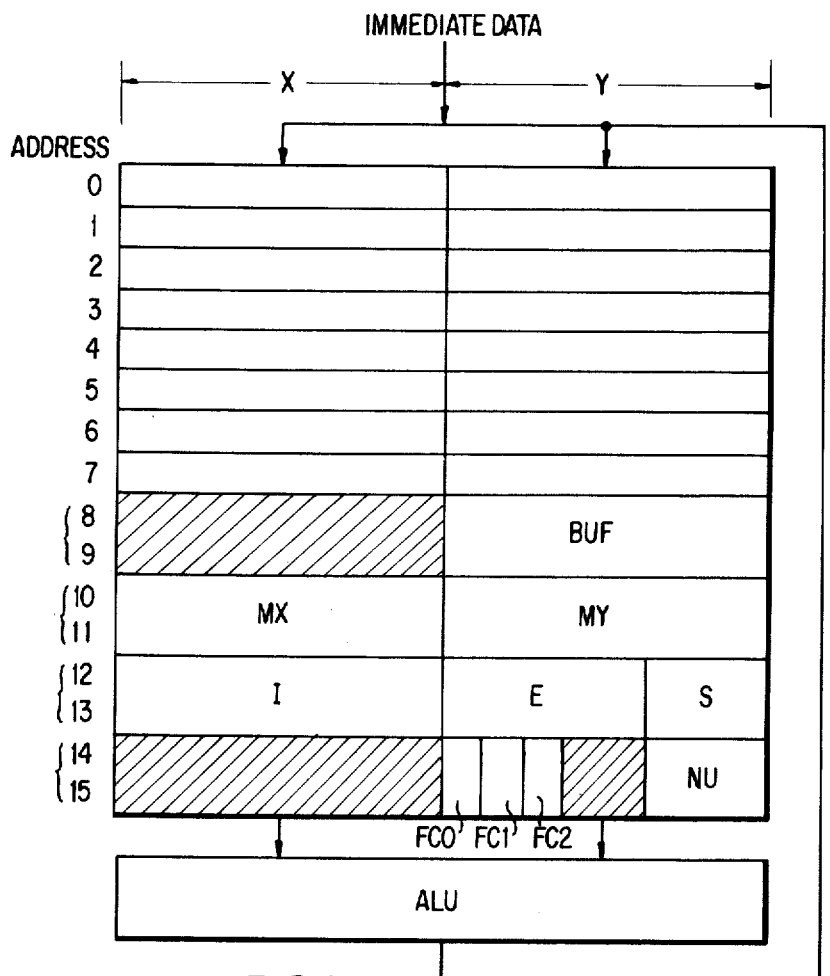
FIG. 6 is a diagram showing the allocation of addresses in the memory and register group of the processing unit A.

FIG. 5 shows an example of partial processing unit A. The whole of this partial processing unit is governed and driven by the clock signals CLOCK supplied from partial processing unit B. As shown in the drawing, the various circuit blocks are coupled mainly by a set of internal bus lines 31, and transfer of data from one block to another is all effected through the intermediary of the bus lines. In the drawing 32 is a matrix consisting of read-out/write-in memory cells, and forms sixteen 8-bit registers. Addresses X(0) to X(7) and Y(0) to Y(7) are allocated to these registers as shown in FIG. 6. Also, in FIG. 5, LX and LY are temporary latches for temporarily storing contents read out from the memory 32. The reference numeral 33 denotes a group of combined circuits whose function is to perform various arithmetic logic operations regarded as necessary for data processing. The outputs of the latches LX and LY are transferred into this group of circuits as data, and the output of the group (operational results) is fed out to the internal bus line 31. The reference numeral 34 denotes a read only memory in which instruction words are stored; in each machine cycle an instruction word located at a designated address is read out and stored in a D register 35. An I register 36 (addresses X(12), X(13) designates the nature of the operation of the partial processing unit A in a partial cycle (CO cycle) described hereinafter. In an E register 37 (addresses Y(12), Y(13), the highest order bits are the synchronization/non-synchronization signals for the partial processing unit B, and the others are groups of control bits of the data memory medium 3. An S register 38 (addresses Y(12), Y(13)) is a register for transmitting the state of the partial processing unit A to the central processing unit. An MX register 39 (addresses X(10), X(11)) and an MY register 40 (addresses Y(10), Y(11)) are registers storing control information given from the central processing unit 2. A BUF register 41 (addresses Y(8), Y(9)) is a buffer register for effecting a data link with the central processing unit. An NU register 42 (addresses Y(14), Y(15)) indicates the 3 high order bits of the addresses (B bits) of the read only memory 34. An M register 43 is a register storing commands given from the central processing unit. A timing generating circuit 44 is a circuit which performs the functions of producing timing pulses Φs, Φf, ΦP and Φd and state selecting signals RC0, RC1 and RC2 from the clock signals applied from the partial processing unit B. The working flip-flop group 45 is a group of flip-flops performing the functions of storing the output and read-out data of the arithmetic logic operation circuits 33, storing write-in data, and the like. The branching control circuit 46 is used when branching is effected while the instructions of the read only memory 34 are being carried out.

To summarize the operation of the above-mentioned circuit of FIG. 5, read-out data from the memory medium 3 goes through the working flip-flops 45 and into the arithmetic logic operational circuits 33 in order and, on instructions from the read only memory 34, is circulated in the loop consisting of the bus lines 31, the read-out/write-in memory 32, the latches and the circuits 33, whereby series-parallel conversion of the data is effected. This data is sent by way of the bus line 31 to the data buffering register 41 and is taken into the central processng unit. On the other hand, write-in data from the central operational processing equipment is temporarily stored in the buffer register 41, and from there it is circulated, on instructions from the read only memory 34, in the loop consisting of the read-out/write-in memory 32, the latches, the operational circuits 33 and the bus lines 31, whereby parallel-series conversion of the data is effected, and through the intermediary of the working flip-flop 45 is sent as write-in data to the memory medium 3.

Figure 8:
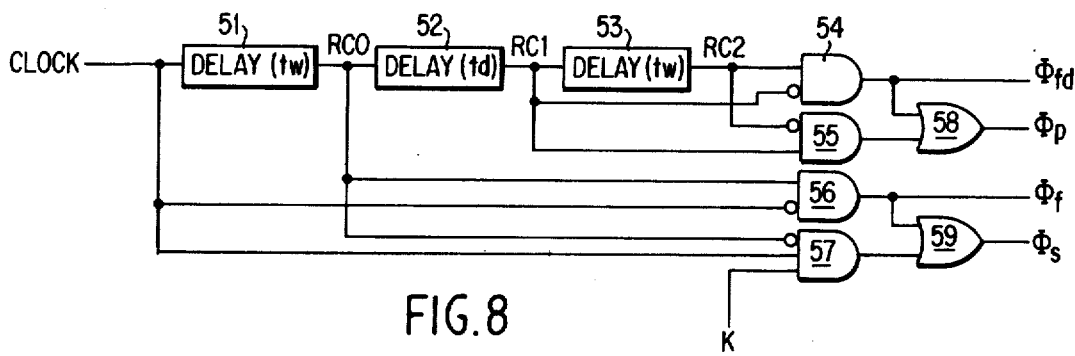
FIG. 8 is a circuit diagram showing an embodiment of the timing pulse generating circuit diagram of the unit A.
Figure 7:
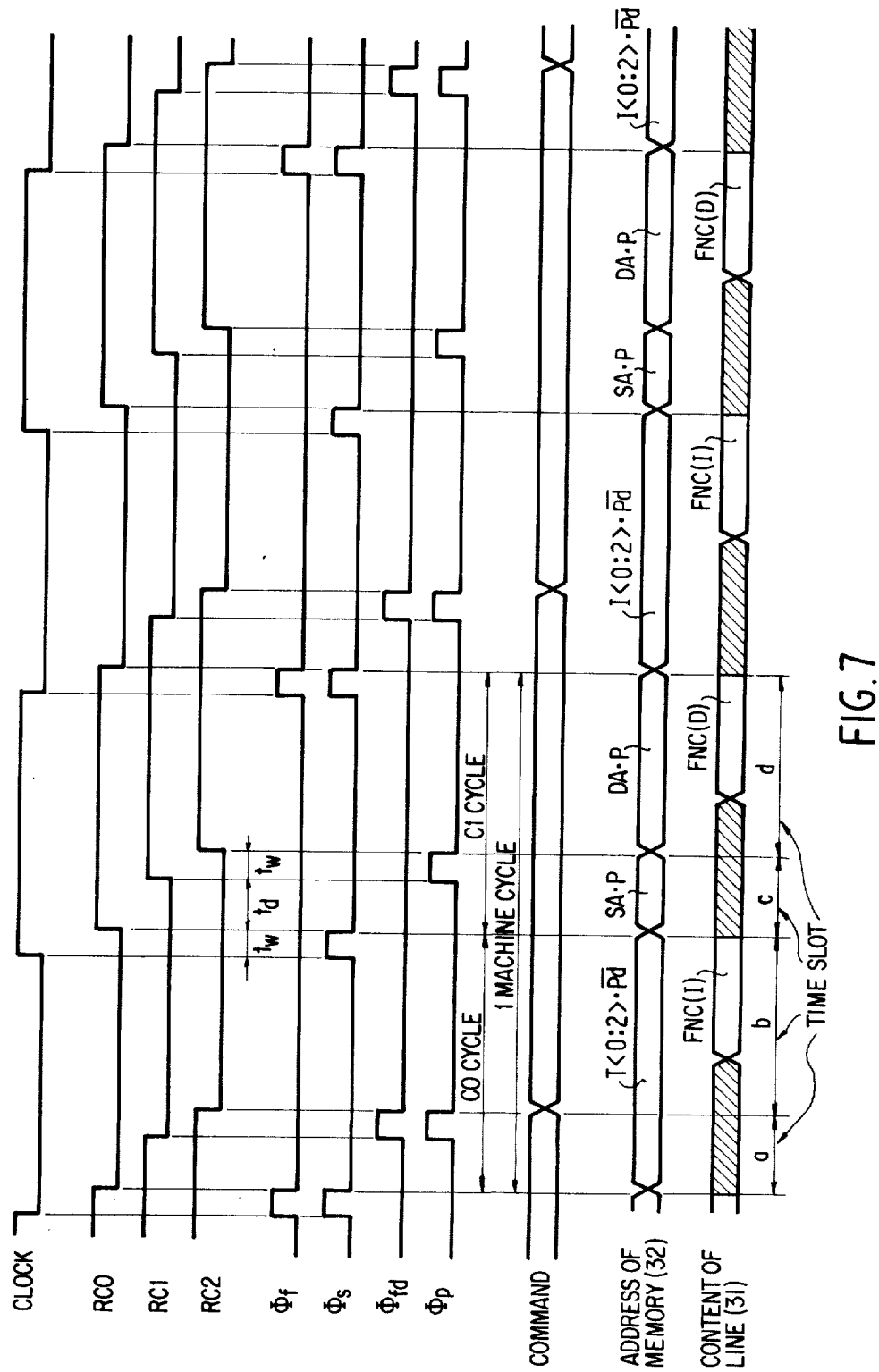
FIG. 7 is a time chart showing the operation of the partial processing unit A.

FIG. 7 shows the waveforms of the dynamic pulses regulating the operation of the circuits described above. The circuit generating these pulses is shown in FIG. 8. As is clear from this Figure, the timing generating circuit 44 produces the aforesaid timing pulses Φfd, ΦP, Φf and Φs, and RC0 to RC2, from the clock signals transmitted from the partial processing unit B. This circuit consists only of delay circuits and gate circuits and, more particularly when the delay circuits 51 to 59 are made as LSI with MOS structure, these circuits generally consist of inverter chains. Also, as described above, when the partial processing unit B is in the synchronizing oscillation mode the width of the sections during which the state is such that the clock signal CLOCK is logical "1" varies according to the read-out data, but the periods of time tw and td of FIG. 7 are determined only by the delay circuits 51 to 53 and are constant. The timing pulses, Φfd, ΦP, Φf and Φs serve the following purposes in partial processing unit A.

Φfd: Storage of instruction words, which have been read out from the read only memory 34, in the D register 35, and setting of the receiving flip-flops $I_0$ and $I_1$ in the working flip-flop group 45.

ΦP: Storage of data, which has been read out from the read-out/write-in memory 32, in the latches LX and LY.

Φf: Setting of the flip-flops N, Z and T in the working flip-flop group 45.

Φs: Storing of contents, which have been supplied as output to the internal bus lines 31, in the read-out/write-in memory 32 and the registers I, E, S, BUF or NU, and setting of the flip-flops C, $W_0$ and $W_8$ in the working flip-flop group 45.

In this embodiment, as shown in FIG. 7 a single machine cycle is divided into two partial cycles; this division is effected by the state selecting signal RC0. That is to say, when RC0 = 0 the partial cycle (C0 cycle) in the first half (data shift), which is governed by the I register 36, is designated and when RC0 = 1 the partial cycle (CI cycle) in the latter half (collation check of data), which is governed by the D register 35, is designated. Also, in FIG. 7, FNC(I) means that the results of arithmetic logic operation based on the contents of the indication of the I register in the C0 cycle, are being supplied as input to the internal bus lines, and FNC(D) means that likewise the results based on the contents of indication of the D register (in which instruction words are stored) in the CI cycle, are being supplied as input.

Figure 9:
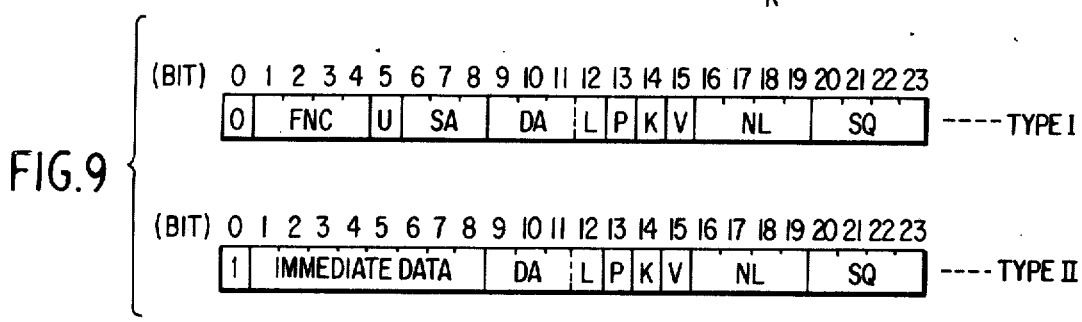
FIG. 9 is the format of the instruction words of the unit A.

FIG. 9 shows the format of instruction words stored in the read only memory 34. These instruction words are broadly classified into two forms, type I and type II. The difference is that with type I (highest order bit 0 the results of the arithmetic logic operations are stored in designated registers or in the read-out/write-in memory, whereas with type II (highest order bit 1) an 8-bit field in the instruction word is fed out as a data pattern to the internal bus line and stored in a designated register or in the read-out/write-in memory. The contents of these instruction words are explained hereunder.

(a) SA (3 bits), DA (3 bits), P (1 bit); in the CI cycle a source address (meaning a read-out address) in the address chart shown in FIG. 6 is designated by a 4-bit field formed by an SA·P series, and a destination address (meaning a read-in address, that is to say a storage address) is designated by a 4-bit field formed by a DA·P series; L is an X/Y indication during storage. On the other hand, in the C0 cycle a source address and a destination address are each designated by an I <0:2> $\overline{Pd}$ chain consisting of the 3 high order bits I <0:2> of the I register and of $\overline{Pd}$ (Pd is a signal consisting of the aforesaid P with a delay of one half of a machine cycle). That is to say, in the embodiment the source address and the destination address must be the same. Also, as regards the X/Y designation in the C0 cycle, this is designated by I <3>. As addresses applied to the read-out/write-in memory 32, the aforesaid SA.P, DA.P and I <0:2> $\overline{Pd}$ fields are applied by the state selecting signals RC0 and RC2 in with the following table.

TABLE

| RC0 | RC2 | Address signal applied | |
|-----|-----|------------------------|---|
| 0 | 1 | <I0 : 2> $\overline{Pd}$ | Source address (C0 cycle) |
| 0 | 0 | <I0 : 2> $\overline{Pd}$ | Destination address (C0 cycle) |
| 1 | 0 | SA . P | Source address (CI cycle) |
| 1 | 1 | DA . P | Destination address (CI cycle) |

According to FIG. 7, when the C0 cycle is commerced, first of all the address signal I <0:2>.$\overline{Pd}$ is applied and the corresponding data is read out. More particularly in case in which the address is 7 or smaller, the data that has been read out is stored in the latches LX, LY by means of the pulse ΦP. The output of the latches, LX, LY is applied to the arithmetic logic operational circuit 33, and through the intermediary of the internal bus line 31 the result is again set, by the pulse Φs, to the word designated by the address I <0:2>.$\overline{Pd}$. Now, if I <3> = 0 the storage is on the X side, and if I <3> = 1 the storage is on the Y side. Next, when the CI cycle is commenced the address SA.P is applied and, as described previously, is stored in the latches LX, LY by means of the pulse ΦP if the address is 7 or smaller. When this storage is completed, the applied address is changed to DA.P, and by the pulse Φs the result of the arithmetical logical operation is stored in the word corresponding to this address. Now, if L = 0 the storage is on the X side and if L = 1 the storage is on the Y side. In the C0 cycle this is designated by I <3>. If I <3> = 0 the storage is on the X side and if I <3> = 1 the storage is on the Y side. If the address is 8 or larger the operation is also of approximately the same nature as described above. (b) FNC (4 bits): This is a 4-bit field designating the arithmetic logic operational function performed in the CI cycle. Now, in the C0 cycle this is designated by the 4-bit field I <4:7>. The arithmetic logic operations designated by the FNC field (CI cycle) and by I <4:7> (C0 cycle) are listed hereunder. In this list, the following expressions have the meaning shown in each case.

LX <k> (k = 0 to 7): the content of the bit k in latch LX
LY <k> (k = 0 to 7): the content of the bit k in latch LY
B <k> : the content of the bit k in internal bus line 31

① THX : B <k> ← LX <k> (k = 0 to 7)
② THY : B <k> ← LY <k> (k = 0 to 7)
③ SKY : B <k> ← LY <7 − k> (k = 0 to 7)
④ RIX : B <7> ← $\bar{P} \cdot I_0 + P \cdot I_1$
       ; B <k> ← LX <k + 1> (k = 0 to 6)
       ; C ← LX <0>
⑤ RIY : B <7> ← $\bar{P} \cdot I_0 + P \cdot I_1$
       ; B <k> ← LY <k + 1> (k = 0 to 6)
       ; C ← LY <0>
⑥ RCX : B <7> ← C
       ; B <k> ← LX <k + 1> (k = 0 to 6)
       ; C ← LX <0>
⑦ RCY : B <7> ← C
       ; B <k> ← LY <k + 1> (k = 0 to 6)
       ; C ← LY <0>
⑧ XOR : B <k> ← LX <k> ⊕ LY <k> (k = 0 to 7)
       ( ⊕ means exclusive logical sum)
⑨ CRI : P = 1 : B <7> ← CI; B <k> ← (LX <k + 1>
                  − LY <k + 1>) . CI + LY <k + 1>
                  . $\overline{CI}$ (k = 0 to 6); W8 ← (LX <0>
                  ⊕ LY <0>) . CI + LY <0> . $\overline{CI}$
⑩ CRN : P = 0 : B <7> ← W8 ; B <k> ← LX <k + 1> <
                  ⊕ LY <k + 1> . CI + LY <k + 1> .
                  $\overline{CI}$ (k = 0 to 6); W0 ← B <0>
       here, Ci = { $I_1$ ⊕ W0 ( in the case of CRI)
                    N ⊕ W0 ( in case of CRN)
⑪ IMY : B ← LY   PLUS 1 (arithmetical addition)
⑫ DMY : B ← LY   MINUS 1 (arithmetical subtraction)
⑬ SBT : B ← LY   MINUS LY (arithmetical subtraction)

Figure 10:
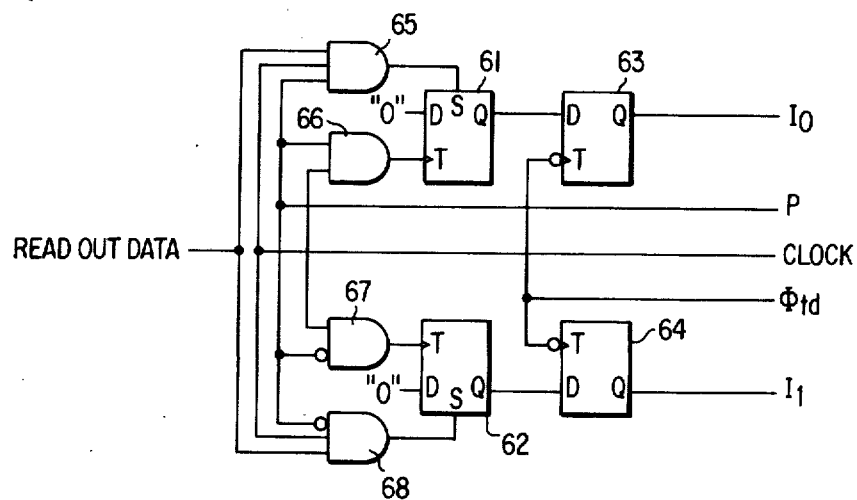
FIG. 10 is a diagram of the read-out data input circuit of the unit A.
Figure 11:
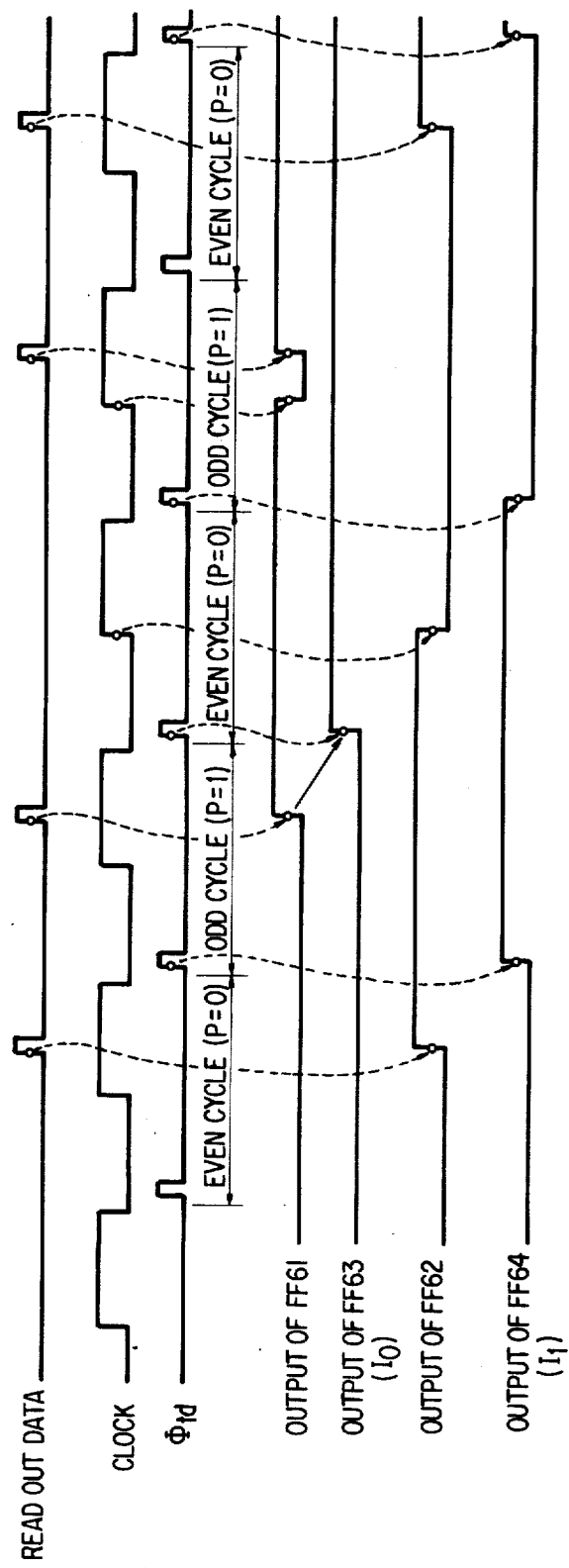
FIG. 11 is a time chart showing the operation of the circuit illustrated in FIG. 10.

Next, the read-out data intake circuit (receiving circuit) is shown in FIG. 10, and its sequence of operations is shown in FIG. 11. The circuit of FIG. 10 is included in the working flip-flop group in the structural diagram in FIG. 5, but functionally it is closely related to the arithmetic logic operational circuit 33. As described in connection with the partial processing unit B, in the synchronizing oscillation mode, the clock signal CLOCK is corrected by the partial processing unit B so that the read-out data will be captured in the sections in which this signal is logical "1". The system adopted is such that when this is received, in the partial processing unit A, first of all, the input latch 61 or 62 is cleared as the clock signal rises, and afterwards if read-out data has been supplied as input in the section in which the clock signal is logical "1", the latch 61 or 62 is set. But if read-out data is not supplied as input, it is still logical "0". In particular, in the embodiment the aforesaid signal P (one of the fields of the instruction words; 1 bit) determines whether read-out data is set in the latch 61 or whether it is set in the latch 62. As shown in FIG. 11, in the synchronizing oscillation mode, machine cycles in which P = 0 and machine cycles in which P = 1 occur in alternation, and therefore successive read-out data is set in the latches 61 and 62 alternately, as is clear from FIG. 10. The system of storing data alternately in this way is adopted because the unit of the embodiment treats modulated data in which clock bits appear in alternation, as shown in FIG. 2. Read-out data which has thus been set in the latch 61 or 62 is set, by the pulse Φfd, in latch 63 or 64 respectively. Now, the output I₀ of the latch 63 and the output I₁ of the latch 64 are supplied to the arithmetic logic operation circuit 33. That is to say, read-out data has been read in during the CLOCK = 1 section of one machine cycle is subjected to the actual arithmetic logic operation after the C0 cycle of the next machine cycle.

The operation of the data input process described above will now be illustrated by taking an example. Here, a case will be described in which an "E 5" (signal meaning that data is coming in after this) pattern in sexagesimal notation is discovered in the read-out data.

First, we take it that the following assumptions are made.

(1) The read-out data buffer is made Y(1).
(2) The aforesaid "E5" pattern is written in at X(1).
(3) In the I register, the appropriate indication content is written in to cause the next operation to be carried out in the C0 cycle.

(i) In the 4-bit source address/destination address the 3 high order bits are "000" (I <0:2>, see the foregoing table).

(ii) I <3>, which effects the X/Y indication regarding the storage of the result of the operation in the C0 cycle is "1". That is to say, this is on the Y side.

(iii) As regards the indication of the operation in the C0 cycle, in the foregoing ⑤ RIY is indicated.

By the process described previously, the storage of a data bit in the flip-flop 64 (the output of this is I₁) is timed to occur when Φfd = 1. Here we take it that the machine cycle in which storage in the flip-flop 64 takes place is P = 0 (even number cycle), and the next machine cycle is P = 1 (odd number cycle). That is to say, we take it that the value of the field P of the next instruction word that is read out is "0". In the C0 cycle of this machine cycle, first of all, the contents of the read-out/write-in memory are stored in the latches LX, LY. This is timed to occur when ΦP = 1. In view of the foregoing assumption (i) that I <0:2> = 000, and because $\overline{Pd}$ = 1, the words located at the addresses 0001, that is to say X(1), Y(1), are read out. Now, as described previously Pd is a signal which consists of P delayed by half a cycle, and in the present example the previous machine cycle is P = 0 (even number cycle). Therefore Pd = 0 that is to say $\overline{Pd}$ = 1. Now, in the C0 cycle the address is determined by I <0:2>.$\overline{Pd}$ and is therefore 0001. Also, in the C0 cycle the pulses Φfd and ΦP give the same timing, and therefore the timing of the storage of a data bit in the latch 66 is the same as that of the storage of X(1) and Y(1) in the latched LX and LY respectively (see time slot a in FIG. 7). The contents stored in the latched LX, LY and the output I₁ of the latch 64 are applied to the arithmetic logic operation circuits 33, and in view of the foregoing assumption (iii), the operation RIY is indicated, and therefore the contents

| B | <0> = | LY<1> | (highest order bit) |
|---|-------|-------|---------------------|
| B | <1> = | LY<2> | |
| B | <2> = | LY<3> | |
| B | <3> = | LY<4> | |
| B | <4> = | LY<5> | |
| B | <5> = | LY<6> | |
| B | <6> = | LY<7> | |
| B | <7> = | $I_1$ | (lowest order bit) | are supplied as output to the internal bus line 31. These contents are stored again in Y(1), because of the foregoing contents (i), (ii) stored in the I register. This is timed to occur when $\Phi s = 1$ (see time slot b in FIG. 7).

The operation of the C0 cycle is completed as described above, but in this example the important thing is that Y(1) is shifted one bit to the left, so that $I_1$ is inserted in the lowest order bit.

The following Ci cycle is governed, as described previously, by the instruction word that is read out. This is timed to occur when $\Phi fd = 1$ in this cycle. In this instruction word, again, we take it that the following assumptions are made.

(iv) The NFC field designates the previously described ⑧XOR.

(v) P = 1 (odd number cycle)

(vi) The contents of the SA, DA and L fields are as follows.

$$\left\{ \begin{array}{l} SA = 000 \text{ (the source address is 0001)} \\ DA = \text{ (the destination address is 1111)} \\ L = 0 \end{array} \right.$$

In the CI cycle, on entry into the time slot (c) in FIG. 7, the designation given by SA.P causes X(1) and Y(1) to be read out and stored in LX and LY respectively. This is timed to occur when $\Phi P = 1$. The stored contents are at once applied to the arithmetic logic operational circuits 33, and because the operation XOR is designated for these circuits by the FNC field, the values

| B <0> = | LX <0> ⊕ | LY <0> |
|---------|----------|--------|
| B <1> = | LX <1> ⊕ | LY <1> |
| B <2> = | LX <2> ⊕ | LY <2> |
| B <3> = | LX <3> ⊕ | LY <3> |
| B <4> = | LX <4> ⊕ | LY <4> |
| B <5> = | LX <5> ⊕ | LY <5> |
| B <6> = | LX <6> ⊕ | LY <6> |
| B <7> = | LX <7> ⊕ | LY <7> | are supplied as output to the internal bus line 31. (see time slot d in FIG. 7). On the other hand, the contents of X(1) are stored in LX, and by the foregoing assumption the value "E 5" is sexagesimal notation is stored in X(1), and therefore the foregoing equations showing the contents of the internal bus line 31 can be rewritten as

| B <0> = | 1 ⊕ LY <0> = | LY <0> |
|---------|--------------|--------|
| B <1> = | 1 ⊕ LY <1> = | LY <1> |
| B <2> = | 1 ⊕ LY <2> = | LY <2> |
| B <3> = | 0 ⊕ LY <3> = | LY <3> |
| B <4> = | 0 ⊕ LY <4> = | LY <4> |
| B <5> = | 1 ⊕ LY <5> = | LY <5> |
| B <6> = | 0 ⊕ LY <6> = | LY <6> |
| B <7> = | 1 ⊕ LY <7> = | LY <7> |

That is to say, if the contents of the latch LY (these are the same as the contents of Y (1) are "E 5", then the contents of the bus line all become zero. As regards whether the contents of the bus lin 31 in the CI cycle are all zero or not, that is stored in the flip-flop Z in the working flip-flop group 45, and this is timed to occur when Of = 1. Therefore, by using the output of this Z as conditional branching control, the instruction sequence can be varied according to whether the pattern "E 5" has been detected or not. Now, the above-mentioned conditional branching control is effected by the branching control circuit. As regards the designation of the branching information (for example Z, N, C, . . . ), this is designated by the SA field of the instruction words. In a case in which the abovementioned "E 5" is not detected, it is easy to achieve a pattern "E 5" detection routine by repeating the program steps described above (repetition of shift operation (C0 cycle), detection operation (C1 cycle)). Now, because of the designations given by the P, DA and L fields, the word that becomes the destination is X(15), but as shown in FIG. 6, a word is not alloted to this position. That is to say, as regards the result of the operation of cycle C1, information as to whether this is all zero or not is only stored in Z, and this is discarded.

The fields other than those described above are not directly related to the present invention, but they will be briefly described.

(c) U: This determines whether the highest order bit of the result (8 bits) of the arithmetic logic operation in the C1 cycle is stored in the flip-flop N or not.

(d) V: This determines whether the content of the above-mentioned N is set in the flip-flop T (transmission flip-flop) or not.

(e) K: This determines whether the arithmetic logic operation in the C0 cycle is carried out or not.

(f) NL: This designates those 4 bits of the stored address (8 bits) of the next instruction word to be carried out, which follow those in the register NU.

(g) SQ: This is a field which designates the information supplied for conditional branching control.

Now, in this embodiment the case has been described in which a magnetic disc is used as the memory medium and shaping of the data transferred between this medium and the central processing unit is carried out, but the invention may also be used for instance in cases in which some other means is used as the memory medium.

As described above, when the present invention is used, the high frequency circuit portions which are not suitable for being made as LSI with MOS structure are concentrated in the partial processing unit B so that this is made extremely small. On the other hand, the logical functions required for data processing are almost all concentrated in the partial processing equipment A so that this can be made in LSI form using low speed circuit elements (MOS structure). In this partial processing unit, circuit arrangements with a matrix structure suitable for being made in LSI form are adopted, and therefore the integration efficiency becomes extremely high. The apparatus has simple coupling relationships between the above-mentioned partial processing unit A and B, and this therefore has a very great effect in reducing to a minimum the number of the external lead-out terminals which are essential when the LSI form is used. Also the arrangements are such that the clock signals are made to follow and adapt themselves to the fluctuations of the transferred data, and it is therefore possible to provide data processing equipment which can carry out data processing reliably.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by letters patent of the United States is:

1. A data processor comprising:
    (a) a first partial processing unit having an arithmetic-logic unit (ALU) for processing data, storage means connected to the arithmetic logic unit for storing instruction words to control the operation of the arithmetic-logic unit, a group of register means connected to the arithmetic logic unit for effecting temporary memorization of data, a control signal register connected to the storage means for storing a synchronization/non-synchronization control signal, and timing pulse generating means for generating a plurality of pulses to drive the first partial processing unit, the first partial processing unit being formed on one semiconductor chip,
    (b) a second partial processing unit including clock pulse generating means for forming a clock pulse of controllable frequency, said second partial processing unit comprising,
    an oscillator,
    a divider circuit connected to the oscillator for dividing the oscillation frequency,
    shift circuit means for shifting the output pulse of the divider circuit by a predetermined time period,
    a clock pulse output line connected to the output of the shift circuit means,
    a read-out data receiving circuit means for receiving read-out data; and
    a trap circuit connected to the read-out data receiving circuit means and the clock pulse output line for trapping read-out data,
    whereby when the synchronization/non-synchronization indication (SYN) signal is applied to the second partial processing unit, if the SYN signal is "0" state, the output clock pulse is produced by the divider circuit and the shift circuit means independently of the read-out data, and if the SYN signal is "1" state, the trap circuit traps the read-out data in "1" state of the clock pulse and after that keeps the pulse in a "1" state during said predetermined time;
    (c) a clock signal line for sending out the clock pulse from the second partial processing unit to the timing pulse generating means in the first partial processing unit,
    (d) a control line connecting the first partial processing unit with the second partial processing unit for sending out the synchronization/non-synchronization control signal from the control signal register of the first partial processing unit to the clock pulse generating means of the second partial processing unit to change the frequency of the clock pulse, the plurality of pulses in the first partial processing unit being produced by the timing pulse generating circuit in response to the clock pulse applied from the second partial processing unit as a pulse source.

2. A data processor according to claim 1, which includes:
    (a) a data read-out line for connecting an input/output medium with the first partial processing unit and the second partial processing unit to read out data from the input/output medium to the first partial processing unit and to the second partial processing unit,
    (b) a data write-in line for connecting the input/output medium with the first partial processing unit,
    said synchronization/non-synchronization control signal determining which of either a fixed oscillation mode or a synchronizing oscillation mode of the second partial processing unit is to take effect so that the clock pulses formed by the clock pulse generating means can be made to follow and adapt themselves to the fluctuations in frequency at which the data is read-out.

3. A data processor according to claim 2 wherein the write-in operation of the first partial processing unit is made in the non-synchronization mode.

4. A data processing system comprising:
    (1) an input/output medium,
    (2) a microprocessor comprising
    (a) a first partial processing unit including an arithmetic-logic unit (ALU) for processing data, storage means connected to the arithmetic logic unit for storing instruction words to control the operation of the arithmetic-logic unit, a group of register means connected to the arithmetic logic unit for effecting temporary memorization of data, a control signal register connected to the storage means for storing a synchronization/non-synchronization control signal, and timing pulse generating means for generating a plurality of timing pulses to drive the first partial processing unit, the first partial processing unit being formed on one semiconductor chip,
    (b) a second partial processing unit including clock pulse generating means for forming a clock pulse of controllable frequency;
    (c) a clock signal line for sending out the clock pulse from the second partial processing unit to the timing pulse generating means in the first partial processing unit,
    (d) a synchronization/non-synchronization control line for the read-out data from the input/output medium connecting the control signal register of the first partial processing unit with the clock pulse generating means of the second partial processing unit, the synchronization/non-synchronization control signal determining which of either a fixed oscillation mode or a synchronizing oscillation mode of the second processing unit is effected,
    the plurality of pulses in the first partial processing unit being produced by the timing pulse generating circuit in response to the clock pulse applied from the second partial processing unit as a pulse source,
    (3) a data read-out line for connecting an input/output medium with the first partial processing unit and the second partial processing unit,
    (4) a data write-in line for connecting the input/output medium with the first partial processing unit,
    (5) control lines for connecting the input/output medium with the first partial processing unit,
    (6) a central processing unit connected with the group of register means of the first partial processing unit by transmission control lines and command/data transmission lines,
    whereby data from the input/output medium is read out into the first partial processing unit according to a command of the central processing unit and further sent to the central processing unit, and data in the central processing unit is similarly written in the input/output medium through the first partial processing unit.

5. A data processing system according to claim 4 wherein the input/output medium is a memory one.

6. A data processing system according to claim 4 wherein the input/output medium is a data transmission line.

7. A data processing system according to claim 11 wherein the first partial processing unit functions to make series-parallel conversion of input data from the input/output medium and parallel-series conversion of output data from the central processing unit.

* * * * *